United States Patent [19]

Hoshino

[11] Patent Number: 5,282,258
[45] Date of Patent: Jan. 25, 1994

[54] OPTICAL FIBER CONNECTING APPARATUS

[75] Inventor: Satohiko Hoshino, Yokohama, Japan

[73] Assignee: E. I. Dupont de Nemours & Co., Wilmington, Del.

[21] Appl. No.: 988,437

[22] Filed: Dec. 9, 1992

[30] Foreign Application Priority Data

Dec. 9, 1991 [JP] Japan .................. 3-324759

[51] Int. Cl.$^5$ .............................................. G02B 6/36
[52] U.S. Cl. .............................. 385/70; 385/72; 385/80; 385/84; 385/145
[58] Field of Search ............... 385/66, 67, 68, 70, 385/72, 75, 76, 77, 78, 80, 84, 127, 128, 144, 145

[56] References Cited

U.S. PATENT DOCUMENTS

| | | | |
|---|---|---|---|
| 4,119,363 | 10/1978 | Camlibel et al. | 350/96.2 |
| 4,252,457 | 2/1981 | Benson et al. | 403/284 |
| 4,264,129 | 4/1981 | Warkentine | 385/76 |
| 4,330,171 | 5/1982 | Malsot et al. | 385/80 |
| 4,430,376 | 2/1984 | Box | 428/174 |
| 4,440,469 | 4/1984 | Schumaker | 385/80 |
| 4,482,201 | 11/1984 | Dousset | 350/96.2 |
| 4,615,031 | 9/1986 | Eales et al. | 372/36 |
| 4,844,578 | 7/1989 | Pierini et al. | 385/128 |
| 5,177,806 | 1/1993 | Abbott et al. | 385/76 |

FOREIGN PATENT DOCUMENTS 0148012 11/1986 European Pat. Off. .

*Primary Examiner*—Rodney B. Bovernick
*Assistant Examiner*—John Ngo
*Attorney, Agent, or Firm*—Woodcock, Washburn, Kurtz, Mackiewicz & Norris

[57] ABSTRACT

An optical fiber connecting apparatus includes an optical fiber having a cladding made of a fluoroplastic material, a fixing sleeve made of a fluoroplastic material in which the optical fiber is inserted, an adhesive layer made of a fluoroplastic material provided between an outer circumferential surface of the optical fiber inserted in the fixing sleeve and an inner surface of the fixing sleeve, and a ferrule for fitting the fixing sleeve therein.

2 Claims, 1 Drawing Sheet

OPTICAL FIBER CONNECTING APPARATUS

BACKGROUND OF THE INVENTION

1 Field of the Invention

The present invention relates to an optical fiber connecting apparatus located at the end portion of an optical fiber.

2 Description of the Related Art

An optical fiber connecting apparatus is basically constituted by fixing the end portion of an optical fiber from which the jacket has been removed in a cylindrical member called a ferrule. The ferrule is mounted in the housing or the like of an optical connector.

Conventionally, in order to fix an optical fiber in a ferrule, a hole 32 is formed in the bottom portion of a cylindrical bottomed ferrule 31, and an optical fiber 33 from which the jacket has been removed is inserted in this hole 32. The optical fiber 33 is fixed in the ferrule 31 by using an epoxy-based adhesive 34 or the like, as shown in FIG. 3. Alternatively, a protective member formed by a metal plate or the like is provided on the end portion of the optical fiber and bonded by pressure, and the optical fiber is inserted in the ferrule.

However, the method using the adhesive requires a long drying time and has poor operability. Although an adhesive which is cured by light requires a short curing time (about five to several tens of seconds), it requires a special expensive unit, viz., a light source. On the other hand, in the method wherein the protective member is bonded by pressure, the optical fiber tends to be easily broken during the pressure bonding. Also, after the optical fiber is fixed in the ferrule, the optical fiber sometimes undesirably projects from the protective member due to an environmental change caused by a difference in coefficient of linear expansion between the optical fiber and the protective member.

It is, therefore, believed advantageous to provide an optical fiber connecting apparatus capable of reliably fixing an optical fiber in a ferrule within a short period of time without damaging the optical fiber.

SUMMARY OF THE INVENTION

The present invention relates to an optical fiber connecting apparatus comprising: an optical fiber having a cladding made of a fluoroplastic material; a fixing sleeve made of a fluoroplastic material in which the optical fiber is inserted; an adhesive layer made of a fluoroplastic material, the adhesive layer being provided between an outer circumferential surface of the optical fiber inserted in the fixing sleeve and an inner surface of the fixing sleeve; and a ferrule for fitting the fixing sleeve therein.

The major characteristic feature of the present invention is that an optical fiber having a cladding made of a specific material, i.e., a fluoroplastic material, is used as the optical fiber, and that the adhesive layer formed on the outer circumferential surface of the optical fiber is formed of a fluoroplastic material. Hence, the optical fiber and the fixing sleeve can be reliably fixed through the adhesive layer, and the optical fiber can be reliably fixed in the ferrule by fitting the fixing sleeve into the ferrule.

In order to assemble the optical fiber connecting apparatus according to the present invention, for example, an adhesive solution containing a fluoroplastic material is coated on the outer circumferential surface of the optical fiber. With the fixing sleeve optionally received with the ferrule, the resultant coated optical fiber is inserted in the fixing sleeve. The entire arrangement is heated to remove the solvent in the adhesive solution, thereby forming an adhesive layer made of the fluoroplastic between the outer circumferential surface of the optical fiber inserted in the fixing sleeve and the inner surface of the fixing sleeve. The sleeve with the fiber therein may be inserted into the ferrule. This method enables fixing of the optical fiber within a short period of time since removal of the solvent in the adhesive solution in the process can be completed within several seconds. Also, since the stress acting on the optical fiber is very small, the optical fiber will not be damaged, unlike in the conventional pressure-bonding method.

BRIEF DESCRIPTION OF THE DRAWINGS

The invention will be more fully understood from the following detailed description, taken in connection with the accompanying drawings, in which.

DETAILED DESCRIPTION OF THE PREFERRED EMBODIMENTS

Figure 1:
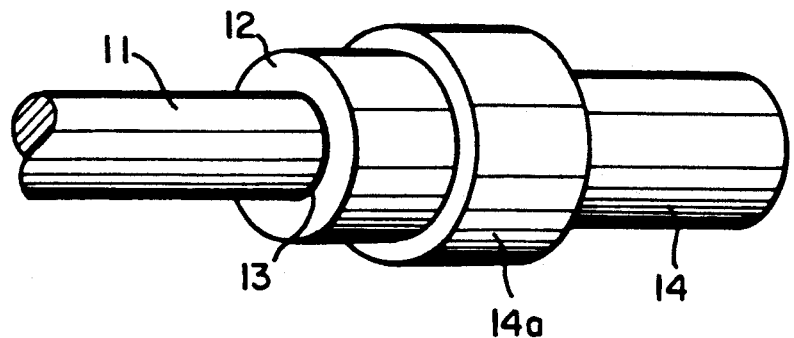
FIG. 1 is a perspective view of an optical fiber connecting apparatus according to an embodiment of the present invention.

The present invention will be described in detail with reference to the accompanying drawings.

An optical fiber 11 used in the present invention has a cladding made of a fluoroplastic material, i.e., a polymer containing fluorine. Any of the various types of optical fibers, e.g., an HPCF (Hard Plastic Cladding Fiber), or an APF (All Plastic Fiber), each having a cladding using a polymer may generally be used.

A fixing sleeve 12 of the present invention is a member having a hollow portion in which the optical fiber 11 is to be inserted. The inner diameter of the fixing sleeve 12 is larger than the outer diameter of the optical fiber 11 by about zero (0) to about ten micrometers (10) $\mu$m. The fixing sleeve 12 is made from a fluoroplastic material, i.e., a polymer containing fluorine. Suitable for use in forming the fixing sleeve 12 is the fluoroplastic material Teflon ® AF (to be described later) and various other fluoroplastics materials.

An adhesive layer 13 made of a fluoroplastic material is provided between the outer circumferential surface of the optical fiber 11 inserted into the fixing sleeve 12 and the inner surface of the fixing sleeve 12. The optical fiber 11 and the fixing sleeve 12 are integrally fixed to each other through the adhesive layer 13. Using a fluoroplastic adhesive layer to adhere the fiber 11 to the sleeve 12 prevents the fiber from projecting undesirably from the sleeve 12 due to temperature changes. The fiber 11 may thus be reliably fixed in a ferrule. A non-crystalline fluoroplastic or polyimide fluoride is preferably used as the fluoroplastic material forming the adhesive layer due to their physical properties and the operability in forming the adhesive layer 13.

As the non-crystalline fluoroplastic material, a copolymer of tetrafluoroethylene and perfluoro(2,2- dimetbyl-1,3-dioxole) can be used. This copolymer is a completely non-crystalline fluoroplastic and is marketed (by E. I. du Pont de Nemours and Company) under the trademark Teflon ® AF. This copolymer exhibits various types of mechanical, thermal, and optical characteristics and the like depending on its copolymerization ratio. Preferred for use in the present invention are Teflon ® AF 1600 having a glass transition temperature of 160° C. and Teflon ® AF 2400 having a glass transition temperature of 240° C.

A ferrule 14 receives and holds the fixing sleeve 12 from the outside. The ferrule 14 may have any arbitrary shape so long as the ferrule serves to receive therein the fixing sleeve 12 with the optical fiber 11 therein. The ferrule 14 is mounted in the housing of the plug or the receptacle of the optical connector to align the optical fiber at a high precision. In the embodiment shown in FIG. 1, the ferrule 14 has a cylindrical shape, and a projecting portion 14a is formed on the outer circumferential surface of one end The ferrule 14 can be fixed in a housing by bringing the projecting portion 14a into contact with a projection in the housing of the optical connector and clamping the ferrule 14 by screws.

The ferrule 14 is preferably formed of PBT (Polybutylene Terephthalate, a thermoplastic polyester) or liquid crystal polymer. It can also be formed of a metal. In the optical fiber connecting apparatus according to the present invention, the ferrule and the fixing sleeve can be integrally formed of a fluoroplastic material, e.g., Teflon ® AF fluoroplastic material.

A method of assembling the optical fiber connecting apparatus according to the present invention will be described by way of an example.

An adhesive solution containing a fluoroplastic material is coated on the outer circumferential surface of the optical fiber 11 having a cladding made of a fluoroplastic material. The adhesive solution preferably uses the solvent manufactured by 3M Company sold under the trademark "Fluoroinert" as the solvent when Teflon ® AF 1600 is used as the fluoroplastic material. In this case, the concentration is about five (5) wt % or less. When Teflon ® AF 2400 fluoroplastic material is used, the concentration of the adhesive solution is selected in accordance with the solubility. The adhesive solution can be coated at room temperature by using a tool like a paint brush. When the ferrule is ten mm in size, the adhesive solution is coated almost on the entire outer circumferential surface of the distal end (for about two mm) of the optical fiber 11.

The optical fiber 11 on which the adhesive solution is coated is inserted in the fixing sleeve 12. In this case, it is preferable that the fixing sleeve 12 is fitted in the ferrule 14 in advance, although this is not necessary. If the fixing sleeve 12 is fitted in the ferrule 14 in advance, the optical fiber 11 can be fixed in the ferrule 14 only by inserting the fiber 11 in the fixing sleeve 12 and performing heating in a manner to be described later, thus facilitating assembly.

The optical fiber 11, the adhesive layer, and the fixing sleeve 12 (and the ferrule 14) are entirely heated to remove the solvent from the adhesive solution and to leave only a solid fluoroplastic, thereby forming the adhesive layer 13 of the fluoroplastic material between the outer circumferential surface of the optical fiber 11 and the inner surface of the fixing sleeve 12. Heating conditions are, e.g., about 80° to 100° C. and about thirty (30) second .

Figure 2:
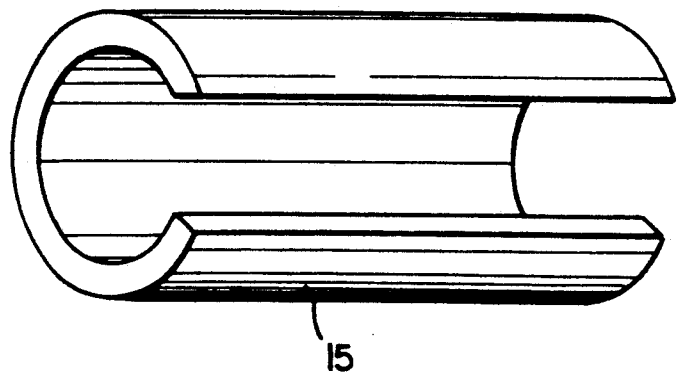
FIG. 2 is a perspective view of an arrangement of an example of a heater used for assembly of the optical fiber connecting apparatus according to the present invention; and, FIG. 3 is a sectional view of a conventional optical fiber connecting apparatus using an adhesive.
Figure 3:
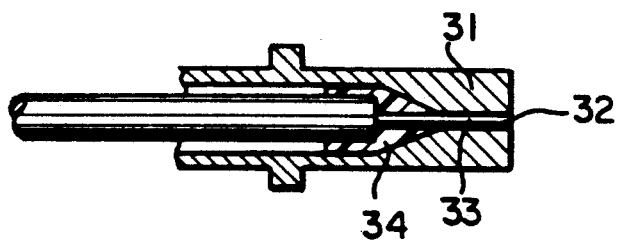

Heating can be performed by inserting the fixing sleeve 12 (and the ferrule 14), in which the optical fiber 11 has been inserted, in, for example, a heater 15 as shown in FIG. 2. During heating a predetermined pressure is applied to the optical fiber 11 so that the optical fiber 11 will not move in the fixing sleeve 12 while the solvent in the adhesive solution is removed.

As has been described above, in the optical fiber connecting apparatus according to the present invention, each of the optical fiber, the adhesive layer, and the fixing sleeve is formed of a fluoroplastic material. Since each of the optical fiber, the adhesive layer, and the fixing sleeve contains fluorine, the adhering force among them is high, the optical fiber and the fixing sleeve are integrally fixed to each other through the adhesive layer, and the optical fiber is reliably fixed to the ferrule. Since the coefficients of linear expansion of the optical fiber, the adhesive layer, and the fixing sleeve are the same or almost the same, the optical fiber will not undesirably project from the fixing sleeve due to a change in temperature.

The optical fiber connecting apparatus according to the present invention has a small number of constituent components, and the structure of each component is simple. Therefore, it is easy to manufacture the respective components, thus decreasing the manufacturing costs.

Furthermore, according to the optical fiber connecting apparatus of the present invention, the optical fiber can be fixed to the fixing sleeve only by coating the adhesive solution on the optical fiber and by heating, as described above, and this heating is completed within about thirty (30) seconds. Therefore, the optical fiber connecting apparatus can be assembled very easily within a short period of time. In addition, since the stress applied to the optical fiber is very small during fixing the optical fiber in the fixing sleeve the optical fiber will not be physically damaged. Also, if the optical fiber in the fixing sleeve, in advance, assembly is completed only by inserting the optical fiber in the fixing sleeve and performing heating. Thus, the operation is facilitated very much, and the productivity can be improved by insert molding.

As has been described above, according to the present invention, the optical fiber can be reliably fixed in the ferrule within a short period of time without any damage. Furthermore, the optical fiber connecting apparatus can be assembled by insert molding, and the optical fiber will not undesirably project from the fixing sleeve in the assembled optical fiber connecting apparatus.

What is claimed is:

1. An optical fiber connecting apparatus comprising:
   an optical fiber having a cladding made of a fluoroplastic material, the fiber having an outer circumferential surface thereon;
   a fixing sleeve made of a fluoroplastic material, the fiber being inserted in the sleeve, the sleeve having an inner surface thereon;
   an adhesive layer made of a fluoroplastic material provided between the outer circumferential surface of a portion of the optical fiber inserted in said fixing sleeve and the inner surface of the fixing sleeve; and
   a ferrule for fitting said fixing sleeve therein.

2. The apparatus according to claim 1, wherein the fluoroplastic material forming the adhesive layer is a resin selected from the group consisting of a non-crystalline fluoroplastic and polyimide fluoride.

* * * * *